United States Patent
Chillar et al.

(10) Patent No.: US 9,470,105 B2
(45) Date of Patent: Oct. 18, 2016

(54) AUTOMATED WATER WASH SYSTEM FOR A GAS TURBINE ENGINE

(71) Applicant: General Electric Company, Schenectady, NY (US)

(72) Inventors: Rahul J. Chillar, Atlanta, GA (US); Dean Matthew Erickson, Greenville, SC (US); George Martin Gilchrist, III, Greenville, SC (US); Michael Savale, Queensbury, NY (US); Mica Lee Longwell, Greenville, SC (US)

(73) Assignee: General Electric Company, Schenectady, NY (US)

( * ) Notice: Subject to any disclaimer, the term of this patent is extended or adjusted under 35 U.S.C. 154(b) by 406 days.

(21) Appl. No.: 14/085,921

(22) Filed: Nov. 21, 2013

(65) Prior Publication Data

US 2015/0135727 A1    May 21, 2015

(51) Int. Cl.
*F01D 25/00*  (2006.01)
*F02C 3/30*  (2006.01)

(52) U.S. Cl.
CPC ........... *F01D 25/002* (2013.01); *F01D 25/007* (2013.01); *F02C 3/30* (2013.01); *F05D 2260/80* (2013.01); *F05D 2270/303* (2013.01)

(58) Field of Classification Search
CPC .............. F01D 25/002; F01D 25/007; F05D 2260/80; F05D 2260/303; F02C 3/30; F02C 3/305; F02C 7/1435
USPC .............. 60/39.53, 801, 39.54, 39.58, 39.55; 134/23, 198
See application file for complete search history.

(56) References Cited

U.S. PATENT DOCUMENTS

| | | | | |
|---|---|---|---|---|
| 6,073,637 A | * | 6/2000 | Hayward | .................. B08B 3/02 134/198 |
| 6,405,521 B1 | * | 6/2002 | Ranasinghe | .......... F01K 21/047 60/39.182 |
| 6,553,768 B1 | | 4/2003 | Trewin et al. | |
| 6,794,417 B2 | | 9/2004 | O'Beck et al. | |

(Continued)

FOREIGN PATENT DOCUMENTS

| | | |
|---|---|---|
| EP | 2243562 A1 | 10/2010 |
| EP | 2672077 A1 | 12/2013 |

OTHER PUBLICATIONS

European Search Report and Opinion issued in connection with corresponding EP Application No. 14193940.5 on Apr. 2, 2015.

*Primary Examiner* — Steven Sutherland
(74) *Attorney, Agent, or Firm* — Sutherland Asbill & Brennan LLP (57) ABSTRACT

The present application and the resultant patent provide a gas turbine engine system. The gas turbine engine system may include a gas turbine engine, a water wash system, and a system controller. The gas turbine engine may include a compressor, a combustor in communication with the compressor, and a turbine in communication with the combustor. The water wash system may be in communication with the gas turbine engine and configured to remove contaminants therefrom. The water wash system may include a number of valves configured to control flows through the water wash system, and a number of sensors configured to measure operating parameters of the water wash system. The system controller may be in communication with the valves and the sensors and operable to automatically control the valves upon receiving operating parameter signals from the sensors in order to perform a wash of the gas turbine engine.

20 Claims, 4 Drawing Sheets

(56) References Cited

U.S. PATENT DOCUMENTS

| | | |
|---|---|---|
| 7,703,272 B2 | 4/2010 | Wagner et al. |
| 7,712,301 B1 * | 5/2010 | Wagner .............. F01D 25/002 134/23 |
| 7,849,878 B2 | 12/2010 | Kohler et al. |
| 8,197,609 B2 | 6/2012 | Alvestig et al. |
| 2002/0177629 A1 | 11/2002 | O'Beck et al. |
| 2007/0028947 A1 | 2/2007 | Erickson et al. |
| 2008/0087300 A1 | 4/2008 | Kohler et al. |
| 2008/0149141 A1 | 6/2008 | Sales |
| 2008/0178909 A1 | 7/2008 | Alvestig et al. |
| 2008/0272040 A1 * | 11/2008 | Nordlund ............ B08B 3/026 210/171 |
| 2009/0235954 A1 * | 9/2009 | Lakdawala ......... B01D 5/0003 134/18 |
| 2010/0147330 A1 | 6/2010 | Kohler et al. |
| 2011/0197923 A1 | 8/2011 | Battaglioli et al. |
| 2012/0103375 A1 | 5/2012 | Alvestig et al. |
| 2012/0222961 A1 | 9/2012 | Smallwood et al. |
| 2013/0186435 A1 | 7/2013 | Saha et al. |

\* cited by examiner

AUTOMATED WATER WASH SYSTEM FOR A GAS TURBINE ENGINE

TECHNICAL FIELD

The present application and the resultant patent relate generally to gas turbine engines and more particularly relate to an automated water wash system and related methods for effectively and efficiently removing contaminants from a gas turbine engine.

BACKGROUND OF THE INVENTION

As a gas turbine engine operates, airborne contaminants may accumulate on various components of the engine, such as the blades and the vanes of the compressor. Although the gas turbine engine may include an inlet air filtration system, a certain degree of contaminant accumulation may be unavoidable and may depend on various environmental conditions at the site of operation. Over time, accumulation of contaminants on the compressor blades and vanes may restrict airflow through the compressor and may shift the airfoil pattern. In this manner, such accumulation may adversely impact the overall performance and efficiency of the gas turbine engine, particularly resulting in decreased power output, increased fuel consumption, and increased operating costs.

In order to reduce contaminant accumulation, the gas turbine engine system may include a water wash system for removing contaminant particles from the compressor blades and vanes. For example, an on-line water wash system may be used to remove contaminant particles from compressor blades and vanes via a flow of water while the gas turbine engine is operating at full speed and is loaded. The on-line water wash system may deliver the flow of water upstream of the compressor via an on-line manifold including nozzles positioned at the gas turbine inlet plenum. The nozzles may create a spray mist of water droplets in this region of relatively low velocity air, and the negative pressure produced by the operating compressor may draw the spray mist into contact with the compressor blades and vanes for contaminant removal.

An off-line water wash system may be used in a similar manner to more effectively remove contaminant particles via a flow of water and detergent while the gas turbine engine is shut down or operating at a turning gear speed and is not loaded. The off-line water wash system may deliver the flow of water and detergent upstream of the compressor via an off-line manifold including nozzles positioned at the gas turbine inlet plenum or other locations along the gas turbine engine. In certain applications, a water wash system may be configured to operate in either an on-line mode or an off-line mode. In this manner, on-line washes may be carried out periodically to increase performance and efficiency of the gas turbine engine when the operating schedule does not permit shutdown time so as to perform a more effective off-line wash. The frequency and duration of on-line and off-line washes may vary depending on the degree of contaminant accumulation and environmental conditions at the site of operation.

Generally described, a water wash system may include a water tank, a detergent tank, a pump, and a mixing mechanism configured to supply a flow of water and detergent for an off-line wash. The water tank, the detergent tank, the pump, the mixing mechanism, and other components may be positioned on a water wash skid or otherwise. The water wash system also may include various manifolds, feed lines, discharge lines, and valves for directing a feed flow of water and detergent into the gas turbine engine and allowing a discharge flow of water, detergent, and contaminant particles to drain therefrom.

Performing an off-line wash with certain water wash systems may be a very complex and time-consuming process that requires several hours of shutdown time and multiple operators to complete, which results in a substantial cost to the operation site. Specifically, the off-line wash process may require manually opening and closing numerous valves at certain times and in a particular sequence to properly control the flow of water and detergent into the gas turbine engine and to allow the discharge flow of water, detergent, and contaminant particles to drain therefrom. Manual errors in controlling these flows may result in a low-quality wash and may unnecessarily extend the duration of the wash. Moreover, the off-line wash process may require physically monitoring certain parameters of the water wash system and making certain adjustments to ensure acceptable quality of the wash. Again, manual errors or improper subjective determinations in monitoring these parameters and making adjustments may result in a low-quality wash and may unnecessarily extend the duration of the wash. Overall, performing the off-line wash process with certain water wash systems may produce varying results with respect to the degree of contaminant removal achieved and the shutdown time required, which ultimately may adversely impact the performance and efficiency of the gas turbine engine and total operating costs.

There is thus a desire for an improved water wash system for removing contaminant particles from a gas turbine engine to improve overall performance and efficiency of the gas turbine engine. Specifically, such a water wash system should simplify performance of an off-line wash process and reduce the amount of shutdown time and the number of operators required to complete an off-line wash. Further, such a water wash system should reduce the incidence of errors in controlling the various flows and monitoring and adjusting the various operating parameters of the water wash system.

SUMMARY OF THE INVENTION

The present application and the resultant patent thus provide a gas turbine engine system. The gas turbine engine system may include a gas turbine engine, a water wash system, and a system controller. The gas turbine engine may include a compressor, a combustor in communication with the compressor, and a turbine in communication with the combustor. The water wash system may be in communication with the gas turbine engine and configured to remove contaminants therefrom. The water wash system may include a number of valves configured to control flows through the water wash system, and a number of sensors configured to measure operating parameters of the water wash system. The system controller may be in communication with the valves and the sensors and operable to automatically control the valves upon receiving operating parameter signals from the sensors in order to perform a wash of the gas turbine engine.

The present application and the resultant patent also provide a method of washing a gas turbine engine to remove contaminants therefrom. The method may include the steps of providing a water wash system in communication with the gas turbine engine, and measuring, via a number of sensors, operating parameters of the water wash system. The method also may include the step of sending, via the number of sensors, operating parameter signals to a system controller. The method further may include the step of automatically controlling, via the system controller, a number of valves of the water wash system to control a number of flows for performing a wash of the gas turbine engine.

The present application and the resultant patent further provide a gas turbine engine system. The gas turbine engine system may include a gas turbine engine, a water wash system, and a system controller. The gas turbine engine may include a compressor, a combustor in communication with the compressor, and a turbine in communication with the combustor. The water wash system may be in communication with the gas turbine engine and configured to remove contaminants therefrom. The water wash system may include a wash feed line and a wash feed valve positioned thereon, a detergent feed line and a detergent feed valve positioned thereon, and a number of sensors configured to measure operating parameters of the water wash system. The system controller may be in communication with the wash feed valve, the detergent feed valve, and the sensors, and operable to automatically control the wash feed valve and the detergent feed valve upon receiving operating parameter signals from the sensors in order to perform a wash of the gas turbine engine.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
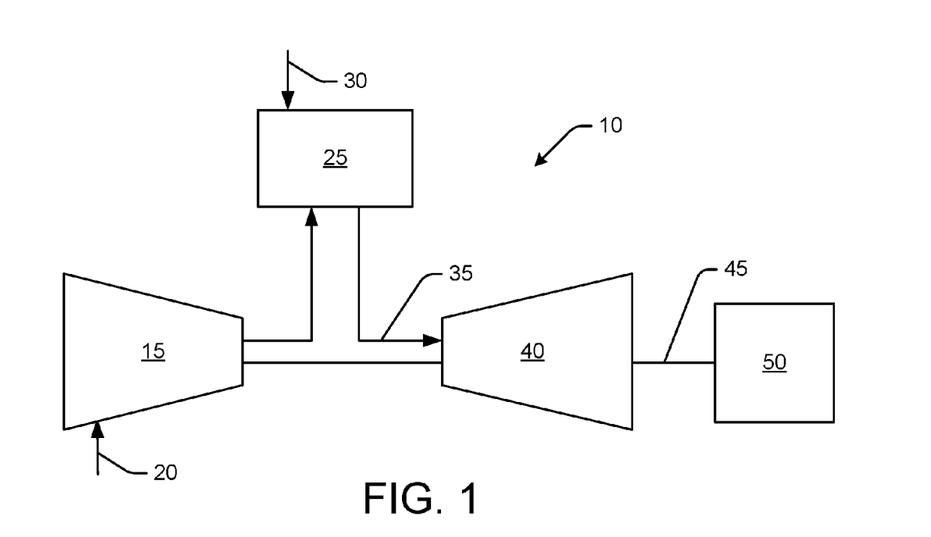
FIG. 1 is a schematic diagram of a gas turbine engine including a compressor, a combustor, and a turbine.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other configurations and other components may be used herein.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
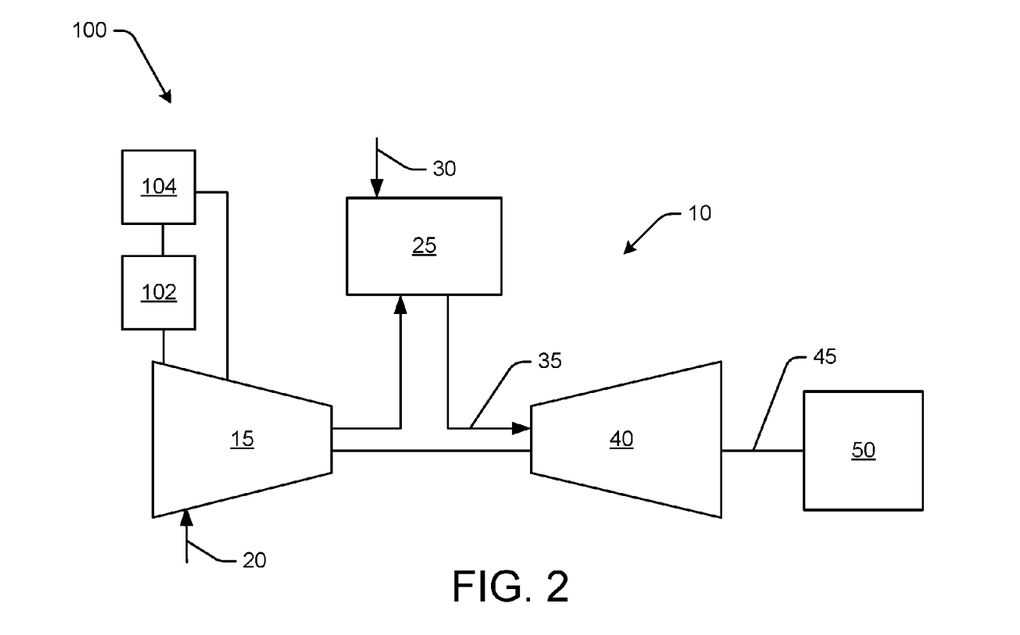
FIG. 2 is a schematic diagram of a gas turbine engine system as may be described herein, the system including a gas turbine engine, a water wash system, and a system controller.

FIG. 2 shows a schematic diagram of a gas turbine engine system 100 as may be described herein. The gas turbine engine system 100 may include the gas turbine engine 10 described above, as is shown. The gas turbine engine system 100 also may include a water wash system 102 in communication with the gas turbine engine 10 and configured to remove contaminants therefrom. In certain embodiments, the water wash system 102 may be in communication with one or more of the compressor 15, the combustor 25, and the turbine 40, as may be described in detail herein below with respect to FIGS. 3 and 4. The gas turbine engine system 100 further may include a system controller 104 in communication with the gas turbine engine 10 and the water wash system 102 and operable to monitor and control various operating parameters. Specifically, the system controller 104 may be operable to monitor and control various operating parameters as well as valve scheduling and timing to automatically perform a water wash process via the water wash system 102, as may be described in detail herein below with respect to FIGS. 3 and 4.

Figure 3:
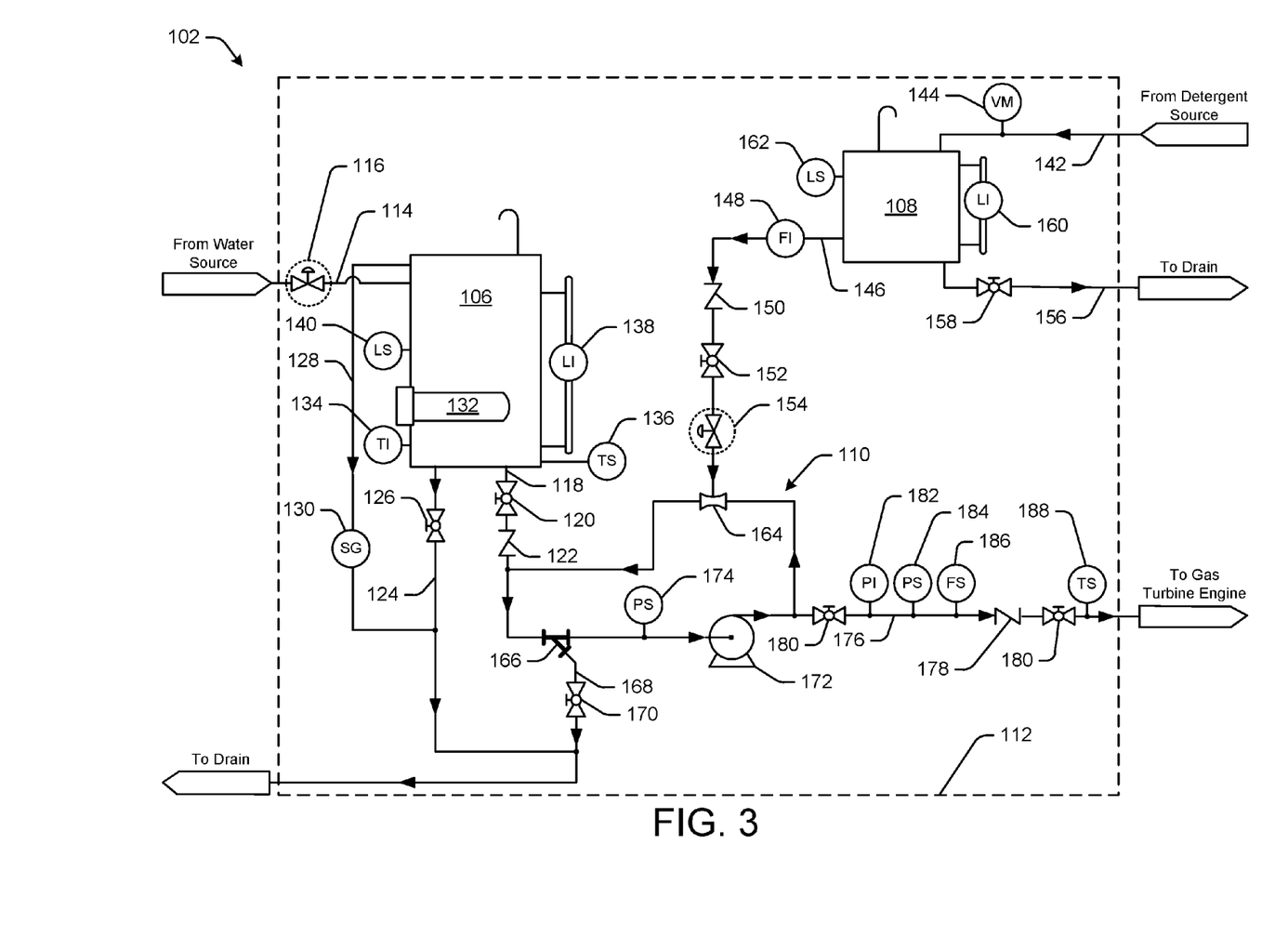
FIG. 3 is a schematic diagram of a portion of the water wash system of the gas turbine engine system of FIG. 2.

FIG. 3 shows a schematic diagram of a portion of the water wash system 102 as may be described herein. The water wash system 102 may include a water tank 106 configured to contain a supply of demineralized water therein, a detergent tank 108 configured to contain a supply of detergent therein, a mixing loop 110 configured to mix the water and detergent therein, and a number of lines and valves configured to direct and control various flows of water, detergent, or water and detergent within the water wash system. As is shown, the water tank 106, the detergent tank 108, the mixing loop 110, certain lines and valves, and other components may be positioned on a water wash skid 112. The water wash system 102 may be configured to operate in either an on-line mode for performing an on-line wash of one or more components of the gas turbine engine 10 or an off-line mode for performing an off-line wash of one or more components of the gas turbine engine 10, as may be described in detail herein below. In some embodiments, water wash system 102 may be configured to perform a wash of one or more of the compressor 15, the combustor 25, and the turbine 40.

As is shown, the water wash system 102 may include a water supply line 114 in communication with the water tank 106 and a water source (not shown), and a water supply valve 116 positioned thereon and configured to control a supply flow of water from the water source to the water tank 106. The water supply line 114 may be in communication with an upper portion of the water tank 106, as is shown. In some embodiments, the water supply valve 116 may be an automated valve in communication with the system controller 104 and may be configured to move from an open position to a closed position. The water wash system 102 also may include a water feed line 118 in communication with the water tank 106 and the mixing loop 110, and a water feed valve 120 positioned thereon and configured to control a feed flow of water from the water tank 106 to the mixing loop 110. The water feed line 118 may be in communication with a lower portion of the water tank 106, as is shown. In some embodiments, the water feed valve 120 may be a throttling valve configured to adjustably control the feed flow of water. The water wash system 102 further may include a water feed check valve 122 positioned on the water feed line 118 downstream of the water feed valve 120. The water feed check valve 122 may be configured to allow the feed flow of water to pass therethrough and to prevent water and detergent from flowing upstream towards the water tank 106.

The water wash system 102 also may include a water drain line 124 in communication with the water tank 106 and a drain (not shown), and a water drain valve 126 positioned thereon and configured to control a drain flow of water from the water tank 106 to the drain. The water drain line 124 may be in communication with a lower portion of the water tank 106, as is shown. In some embodiments, the water drain valve 126 may be a throttling valve configured to adjustably control the drain flow of water. The water wash system 102 further may include a water overflow line 128 in communication with the water tank 106 and the water drain line 124, and a water overflow sight gage 130 positioned thereon and configured to allow visualization of an overflow flow of water from the water tank 106 to the water drain line 124. The water overflow line 128 may be in communication with the upper portion of the water tank 106, as is shown.

The water wash system 102 may include a water heater 132 in communication with the water tank 106 and configured to heat the supply of water contained therein. The water heater 132 may be positioned at least partially within the lower portion of the water tank 106, as is shown. In some embodiments, the water wash system 102 may include a water temperature indicator 134 in communication with the water tank 106 and configured to indicate the temperature of the supply of water. The water wash system 102 also may include a water temperature sensor 136 in communication with the water tank 106 and the system controller 104 and configured to measure the temperature of the supply of water and send a temperature signal to the system controller 104. The water temperature indicator 134 and/or the water temperature sensor 136 may be positioned at the lower portion of the water tank 106, as is shown. In some embodiments, the water wash system 102 may include a water level indicator 138 in communication with the water tank 106 and configured to indicate the level of the supply of water. The water wash system 102 also may include a water level sensor 140 in communication with the water tank 106 and the system controller 104 and configured to measure the level of the supply of water and send a water level signal to the system controller 104.

As is shown in FIG. 3, the water wash system 102 may include a detergent supply line 142 in communication with the detergent tank 108 and a detergent source (not shown), and a detergent supply viscosity sensor 144 positioned thereon and configured to measure the viscosity of a supply flow of detergent from the detergent source to the detergent tank 108. The detergent supply line 142 may be in communication with an upper portion of the detergent tank 108. The detergent supply viscosity sensor 144 may be in communication with the system controller 104 and may be configured to send a viscosity signal to the system controller 104. The water wash system 102 also may include a detergent feed line 146 in communication with the detergent tank 108 and the mixing loop 110, and a detergent feed flow indicator 148 positioned thereon and configured to indicate the flow rate of a feed flow of detergent from the detergent tank 108. The water wash system 102 further may include at least one valve positioned on the detergent feed line 146 and configured to control the feed flow of detergent from the detergent tank 108 to the mixing loop 110. For example, the water wash system 102 may include a detergent feed check valve 150 configured to allow the feed flow of detergent to pass therethrough and to prevent water and detergent from flowing upstream towards the detergent tank 108. The water wash system 102 also may include a detergent feed throttling valve 152 configured to adjustably control the feed flow of detergent. The water wash system 102 further may include a detergent feed automated valve 154 in communication with the system controller 104 and configured to move from an open position to a closed position. The detergent feed check valve 150, the detergent feed throttling valve 152, and the detergent feed automated valve 154 may be positioned relative to one another as is shown in FIG. 3 or otherwise.

The water wash system 102 also may include a detergent drain line 156 in communication with the detergent tank 108 and a drain (not shown), and a detergent drain valve 158 positioned thereon and configured to control a drain flow of detergent from the detergent tank 108 to the drain. The detergent drain line 156 may be in communication with a lower portion of the detergent tank 108, as is shown. In some embodiments, the detergent drain valve 158 may be a throttling valve configured to adjustably control the drain flow of detergent. The water wash system 102 further may include a detergent level indicator 160 in communication with the detergent tank 108 and configured to indicate the level of the supply of detergent. The water wash system 102 also may include a detergent level sensor 162 in communication with the water tank 106 and the system controller 104 and configured to measure the level of the supply of detergent and send a detergent level signal to the system controller 104.

As described above, the mixing loop 110 may be communication with the water feed line 118 and the detergent feed line 146 and may be configured to mix the feed flows of water and detergent therein. Specifically, the mixing loop 110 may include a venturi mixing eductor 164 positioned at the intersection of the detergent feed line 146 and the mixing loop 110 and configured to mix the feed flows of water and detergent. The mixing loop 110 also may include a strainer 166 configured to remove any undesired particles or contaminants flowing through the mixing loop 110. The water wash system 102 may include a mixing loop drain line 168 in communication with the strainer 166 and the water drain line 124, and a mixing loop drain valve 170 positioned thereon and configured to control a drain flow of water and detergent from the mixing loop 110 to the drain. In some embodiments, the mixing loop drain valve 170 may be a throttling valve configured to adjustably control the drain flow of water and detergent. The mixing loop 110 also may include a forwarding pump 172 configured to move the flow of water and detergent through the mixing loop 110, as is shown. In some embodiments, the water wash system 102 may include a pressure sensor 174 positioned on the mixing loop 110 upstream of the forwarding pump 172 and in communication with the system controller 104. The pressure sensor 174 may be configured to measure the pressure of the flow of water and detergent flowing into the forwarding pump 172 and send a pressure signal to the system controller 104.

As is shown in FIG. 3, the water wash system 102 may include a wash feed line 176 in communication with the mixing loop 110 and configured to direct the feed flow of water and detergent toward the gas turbine engine 10. The water wash system 102 also may include at least one valve positioned on the wash feed line 176 and configured to control the feed flow of water and detergent from the mixing loop 110 to the gas turbine engine 10. In some embodiments, the water wash system 102 may include a wash feed check valve 178 configured to allow the feed flow of water and detergent to pass therethrough and to prevent water and detergent from flowing upstream towards the mixing loop 110. The water wash system 102 also may include a number of wash feed throttling valves 180 configured to adjustably control the feed flow of water and detergent. As is shown, a first wash feed throttling valve 180 may be positioned upstream of the wash feed check valve 178, and a second wash feed throttling valve 180 may be positioned downstream of the wash feed check valve 178.

In some embodiments, the water wash system 102 may include a wash feed pressure indicator 182 positioned on the wash feed line 176 and configured to indicate the pressure of the feed flow of water and detergent. The water wash system 102 also may include a wash feed pressure sensor 184 positioned on the wash feed line 176 and in communication with the system controller 104. The wash feed pressure sensor 184 may be configured to measure the pressure of the feed flow of water and detergent and send a pressure signal to the system controller 104. The water wash system 102 further may include a wash feed flow sensor 186 positioned on the wash feed line 176 and in communication with the system controller 104. The wash feed flow sensor 186 may be configured to measure the flow rate of the feed flow of water and detergent and send a flow rate signal to the system controller 104. The wash feed pressure indicator 182, the wash feed pressure sensor 184, and the wash feed flow sensor 186 may be positioned between the wash feed throttling valves 180 as is shown or otherwise. The water wash system 102 also may include a number of wash feed temperature sensors 188 positioned on the wash feed line 176 and in communication with the system controller 104. The wash feed temperature sensors 188 may be configured to measure the temperature of the feed flow of water and detergent and send a temperature signal to the system controller 104. As is shown, a first wash feed temperature sensor 188 may be positioned on the water wash skid 112, and a second wash feed temperature sensor 188 may be positioned downstream of the water wash skid 112 near the gas turbine engine 10.

Figure 4:
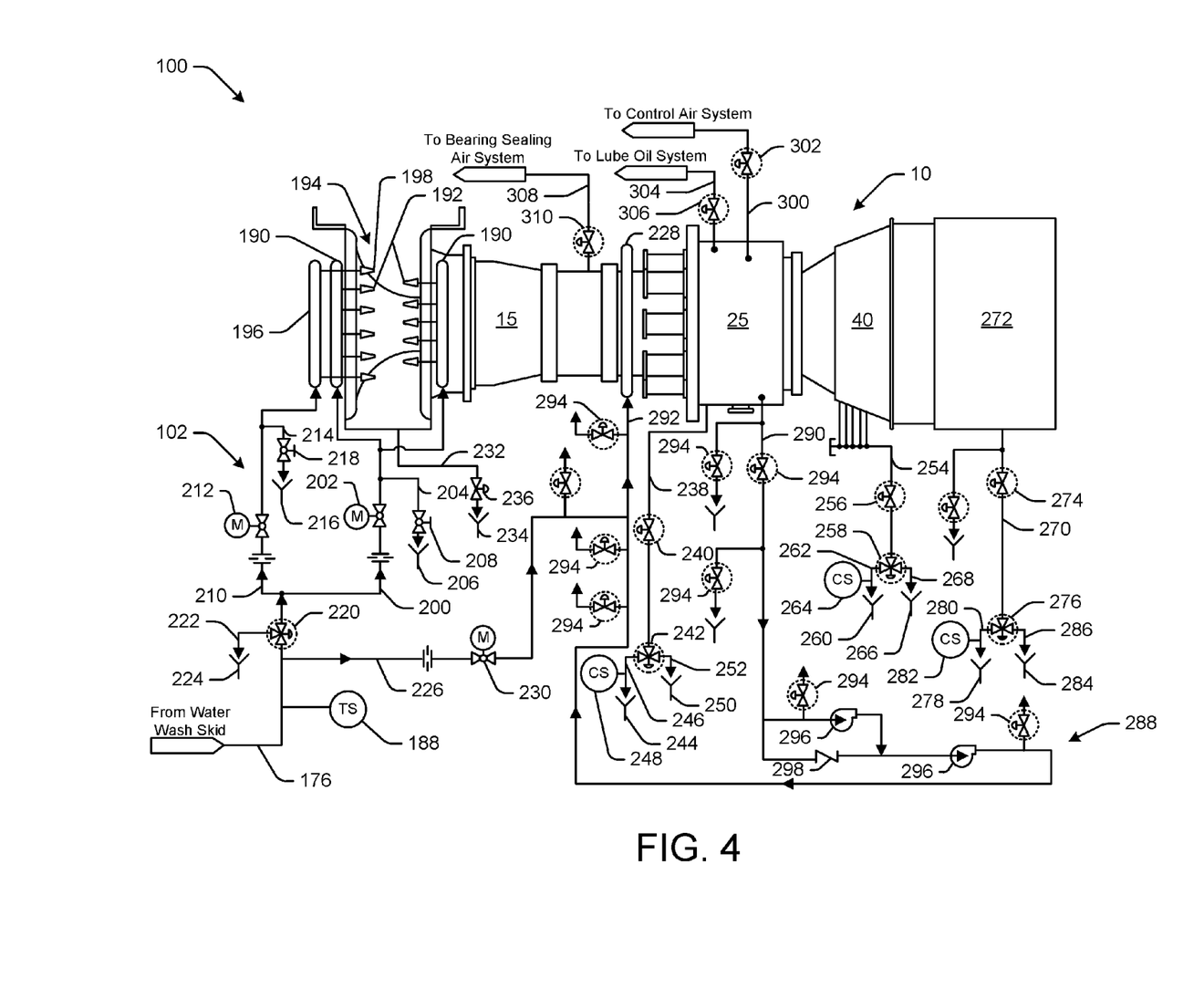
FIG. 4 is a schematic diagram of a portion of the gas turbine engine and the water wash system of the gas turbine engine system of FIG. 2.

FIG. 4 shows a schematic diagram of a portion of the gas turbine engine 10 and the water wash system 102 of the gas turbine engine system 100 as may be described herein. The water wash system 102 may include one or more wash manifolds in communication with the gas turbine engine 10 and configured to deliver the feed flow of water and detergent, or alternatively a feed flow of water only, to certain locations along the gas turbine engine 10 to perform a wash. Specifically, the water wash system 102 may include a number of on-line wash manifolds 190 each including a number of nozzles 192 positioned within the gas turbine inlet plenum 194 upstream of the compressor 15. In some embodiments, the water wash system 102 may include a first on-line wash manifold 190 positioned at the head end of the inlet plenum 194 and a second on-line wash manifold 190 positioned at the aft end of the inlet plenum 194, as is shown. The water wash system 102 also may include an off-line wash manifold 196 including a number of nozzles 198 positioned within the gas turbine inlet plenum 194 upstream of the compressor 15, as is shown. Any number of on-line wash manifolds 190, off-line wash manifolds 196, and corresponding nozzles 192, 198 may be used herein in various configurations.

The water wash system 102 may include an on-line wash feed line 200 in communication with the wash feed line 176 and the on-line wash manifolds 190. The water wash system 102 also may include an on-line wash feed valve 202 positioned on the on-line wash feed line 200 and configured to control a feed flow of water to the on-line wash manifolds 190. In some embodiments, the on-line wash feed valve 202 may be an automated valve in communication with the system controller 104 and may be configured to move from an open position to a closed position. The water wash system 102 further may include an on-line wash drain line 204 in communication with the on-line wash feed line 200 and an on-line wash drain 206, and on-line wash drain valve 208 positioned thereon. In some embodiments, the on-line wash drain valve 208 may be a throttling valve configured to adjustably control a drain flow of water from the on-line wash feed line 200 to the on-line wash drain 206.

As is shown, the water wash system 102 may include an off-line wash feed line 210 in communication with the wash feed line 176 and the off-line wash manifold 196. The water wash system 102 also may include an off-line wash feed valve 212 positioned on the off-line wash feed line 210 and configured to control a feed flow of water and detergent to the off-line wash manifold 196. In some embodiments, the off-line wash feed valve 212 may be an automated valve in communication with the system controller 104 and may be configured to move from an open position to a closed position. The water wash system 102 further may include an off-line wash drain line 214 in communication with the off-line wash feed line 210 and an off-line wash drain 216, and off-line wash drain valve 218 positioned thereon. In some embodiments, the off-line wash drain valve 218 may be a throttling valve configured to adjustably control a drain flow of water and detergent from the off-line wash feed line 210 to the off-line wash drain 216.

The water wash system 102 also may include a wash feed automated valve 220 positioned on the wash feed line 176 upstream from the on-line wash feed line 200 and the off-line wash feed line 210, as is shown. In some embodiments, the wash feed automated valve 220 may be a three-way valve in communication with a wash drain line 222 leading to a wash drain 224. In this manner, the wash feed automated valve 220 may be in communication with the system controller 104 and may be configured to move between a first open position, a second open position, and a closed position. When in the first open position, the wash feed automated valve 220 may direct the wash feed flow to the on-line wash feed line 200 and the off-line wash feed line 210. When in the second open position, the wash feed automated valve 220 may direct the wash feed flow to the wash drain line 222. In some embodiments, the wash feed automated valve 220 may be moved to the second open position to drain cold water from the wash feed line 176 and allow the wash feed line 176 to then fill with hot water for a more effective off-line wash of the compressor 15, the combustor 25, and/or the turbine 40. Additionally, the wash feed automated valve 220 may be moved to the second open position to flush out detergent from the wash feed line 176 prior to commencing a rinse cycle of an off-line wash. When in the closed position, the wash feed automated valve 220 may prevent the wash feed flow from entering the on-line wash feed line 200, the off-line wash feed line 210, and the wash drain line 222.

In some embodiments, the water wash system 102 may include an air manifold wash feed line 226 in communication with the wash feed line 176 and an air manifold 228 of the gas turbine engine 10. The air manifold 228 may be an atomizing air manifold positioned at the head end of the combustor 25, as is shown. The water wash system 102 also may include an air manifold wash feed valve 230 positioned on the air manifold wash feed line 226 and configured to control a feed flow of water to the air manifold 228 when performing an off-line wash of the turbine 40. In some embodiments, the air manifold wash feed valve 230 may be an automated valve in communication with the system controller 104 and may be configured to move from an open position to a closed position. When in the open position, the air manifold wash feed valve 230 may direct the feed flow of water to the air manifold 228 for an off-line wash of the turbine 40. When in the closed position, the air manifold wash feed valve 230 may prevent the feed flow from reaching the air manifold 228.

As is shown in FIG. 4, the water wash system 102 may include a number of discharge lines positioned at various locations along the gas turbine engine 10 and configured to allow discharge flows of water, detergent, and contaminant particles to drain therefrom. Specifically, the water wash system 102 may include an inlet plenum discharge line 232 in communication with the inlet plenum 194 and an inlet plenum discharge drain 234. As is shown, the water wash system 102 may include an inlet plenum discharge valve 236 positioned on the inlet plenum discharge line 232 and configured to control a discharge flow of water, detergent, and contaminant particles therethrough.

The water wash system 102 also may include a combustor discharge line 238 in communication with the combustor 25, and a combustor discharge valve 240 positioned thereon and configured to control a discharge flow of water, detergent, and contaminant particles therethrough during a wash. The combustor discharge valve 240 also may be configured to control a discharge flow of unburned fuel therethrough during a false start of the gas turbine engine 10. In some embodiments, the combustor discharge valve 240 may be an automated valve in communication with the system controller 104 and configured to move from an open position to a closed position. The water wash system 102 further may include a combustor discharge drain valve 242 positioned at a downstream end of the combustor discharge line 238. In some embodiments, the combustor discharge drain valve 242 may be a three-way automated valve in communication with the system controller 104 and configured to move between a first open position, a second open position, and a closed position. When in the first open position, the combustor discharge drain valve 242 may direct the discharge flow of water, detergent, and contaminant particles to a combustor discharge wash drain 244 via a combustor discharge wash drain line 246. In some embodiments, the water wash system 102 may include a combustor discharge conductivity sensor 252 positioned on the combustor discharge wash drain line 246 and in communication with the system controller 104. The combustor discharge conductivity sensor 252 may be configured to measure the conductivity of the discharge flow of water, detergent, and contaminant particles and send a conductivity signal to the system controller 104. When in the second open position, the combustor discharge drain valve 242 may direct the discharge flow of unburned fuel to a combustor discharge false start drain 250 via a combustor discharge false start drain line 252. When in the closed position, the combustor discharge drain valve 242 may prevent any discharge flow from passing therethrough.

As is shown, the water wash system 102 also may include a turbine discharge line 254 in communication with the turbine 40, and a turbine discharge valve 256 positioned thereon and configured to control a discharge flow of water, detergent, and contaminant particles therethrough during a wash. The turbine discharge valve 256 also may be configured to control a discharge flow of unburned fuel therethrough during a false start of the gas turbine engine 10. In some embodiments, the turbine discharge valve 256 may be an automated valve in communication with the system controller 104 and configured to move from an open position to a closed position. The water wash system 102 further may include a turbine discharge drain valve 258 positioned at a downstream end of the turbine discharge line 254. In some embodiments, the turbine discharge drain valve 258 may be a three-way automated valve in communication with the system controller 104 and configured to move between a first open position, a second open position, and a closed position. When in the first open position, the turbine discharge drain valve 258 may direct the discharge flow of water, detergent, and contaminant particles to a turbine discharge wash drain 260 via a turbine discharge wash drain line 262. In some embodiments, the water wash system 102 may include a turbine discharge conductivity sensor 264 positioned on the turbine discharge wash drain line 262 and in communication with the system controller 104. The turbine discharge conductivity sensor 264 may be configured to measure the conductivity of the discharge flow of water, detergent, and contaminant particles and send a conductivity signal to the system controller 104. When in the second open position, the turbine discharge drain valve 258 may direct the discharge flow of unburned fuel to a turbine discharge false start drain 266 via a turbine discharge false start drain line 268. When in the closed position, the turbine discharge drain valve 258 may prevent any discharge flow from passing therethrough.

The water wash system 102 further may include an exhaust plenum discharge line 270 in communication with an exhaust plenum 272 of the gas turbine engine 10, and an exhaust plenum discharge valve 274 positioned thereon and configured to control a discharge flow of water, detergent, and contaminant particles therethrough during a wash. The exhaust plenum discharge valve 274 also may be configured to control a discharge flow of unburned fuel therethrough during a false start of the gas turbine engine 10. In some embodiments, the exhaust plenum discharge valve 274 may be an automated valve in communication with the system controller 104 and configured to move from an open position to a closed position. The water wash system 102 also may include an exhaust plenum discharge drain valve 276 positioned at a downstream end of the exhaust plenum discharge line 270. In some embodiments, the exhaust plenum discharge drain valve 276 may be a three-way automated valve in communication with the system controller 104 and configured to move between a first open position, a second open position, and a closed position. When in the first open position, the exhaust plenum discharge drain valve 276 may direct the discharge flow of water, detergent, and contaminant particles to an exhaust plenum discharge wash drain 278 via an exhaust plenum discharge wash drain line 280. In some embodiments, the water wash system 102 may include an exhaust plenum discharge conductivity sensor 282 positioned on the exhaust plenum discharge wash drain line 280 and in communication with the system controller 104. The exhaust plenum discharge conductivity sensor 282 may be configured to measure the conductivity of the discharge flow of water, detergent, and contaminant particles and send a conductivity signal to the system controller 104. When in the second open position, the exhaust plenum discharge drain valve 276 may direct the discharge flow of unburned fuel to an exhaust plenum discharge false start drain 284 via an exhaust plenum discharge false start drain line 286. When in the closed position, the exhaust plenum discharge drain valve 276 may prevent any discharge flow from passing therethrough.

As is shown in FIG. 4, the gas turbine engine system 100 also may include an atomizing air system 288 in communication with the gas turbine engine 10. Specifically, the atomizing air system 288 may be in communication with the aft end of the combustor 25 via an atomizing air extraction line 290 and may be in communication with the atomizing air manifold 228 via an atomizing air feed line 292. In this manner, the atomizing air system 288 may be configured to direct an extraction flow of air from the aft end of the combustor 25 to the air manifold 228. As is shown, the atomizing air system 288 also may include a number of atomizing air valves 294 configured to control the extraction flow of air within the atomizing air system 288 or to control portions of the extraction flow of air that may be directed to other portions of the gas turbine engine system 100. In some embodiments, one or more of the atomizing air valves 294 may be an automated valve in communication with the system controller 104 and configured to move from an open position to a closed position. The atomizing air system 288 further may include one or more atomizing air pumps 296 configured to move the extraction flow of air within the atomizing air system 288, and one or more atomizing air check valves 298 configured to control the extraction flow of air, as is shown.

In some embodiments, the gas turbine engine system 100 may include a control air extraction line 300 in communication with the combustor 25 and a control air system (not shown), and a control air extraction valve 302 positioned thereon and configured to control an extraction flow of air therethrough. The control air extraction valve 302 may be an automated valve in communication with the system controller 104 and configured to move from an open position to a closed position. As is shown, the gas turbine engine system 100 also may include a lube oil air extraction line 304 in communication with the combustor 25 and a lube oil system (not shown), and a lube oil air extraction valve 306 positioned thereon and configured to control an extraction flow of air therethrough. The lube oil air extraction valve 306 may be an automated valve in communication with the system controller 104 and configured to move from an open position to a closed position. The gas turbine engine system 100 further may include a bearing sealing air extraction line 308 in communication with the aft end of the compressor 15 and a bearing sealing system (not shown), and a bearing sealing air extraction valve 310 positioned thereon and configured to control an extraction flow of air therethrough. The bearing sealing air extraction valve 310 may be an automated valve in communication with the system controller 104 and configured to move from an open position to a closed position.

As discussed above, the system controller 104 may be operable to monitor and control various operating parameters as well as valve scheduling and timing to automatically perform a water wash process via the water wash system 102. Specifically, the system controller 104 may be in communication with various sensors of the water wash system 102 to receive signals relating to certain operating parameters. For example, the system controller 104 may be in communication with the water temperature sensor 136, the water level sensor 140, the detergent viscosity sensor 144, the detergent level sensor 162, the mixing loop pressure sensor 174, the wash feed pressure sensor 184, the wash feed flow sensor 186, the wash feed temperature sensor 188, the combustor discharge conductivity sensor 248, the turbine discharge conductivity sensor 265, and the exhaust plenum discharge conductivity sensor 282 to receive signals relating to the respective operating parameters measured by these sensors. Moreover, the system controller 104 may be in communication with various valves of the water wash system 102 and the overall gas turbine engine system 100 to monitor, vary, and direct certain flows controlled by the valves. For example, the system controller 104 may be in communication with the water supply valve 116, detergent feed automated valve 154, on-line wash feed valve 202, off-line wash feed valve 212, wash feed automated valve 220, air manifold wash feed valve 230, combustor discharge valve 240, combustor discharge drain valve 242, turbine discharge valve 256, turbine discharge drain valve 258, exhaust plenum discharge valve 274, exhaust plenum discharge drain valve 276, atomizing air valve 294, control air extraction valve 302, lube oil air extraction valve 306, and bearing sealing air extraction valve 310 to monitor, vary, and direct the respective flows controlled by these valves.

In certain embodiments, the system controller 104 may be operable to open, close, or adjust one or more valves in response to receiving a signal from one or more sensors. In this manner, the system controller 104 may be operable to block, direct, or vary one or more flows controlled by the one or more valves in response to receiving a signal indicating that one or more operating parameters measured by the one or more sensors is equal to or greater than a threshold value. For example, the system controller 104 may be operable to move the wash feed automated valve 220 from the second open position to the first open position upon receiving the temperature signal from the wash feed temperature sensor 188 indicating that the feed flow of water in the wash feed line 176 is equal to or greater than a minimum threshold temperature. Accordingly, once the feed flow in the wash feed line 176 has reached the minimum threshold temperature, the feed flow may be directed toward the gas turbine engine 10 for washing, instead of to the wash drain 224. In this manner, the system controller 104 may be operable to prevent a wash from being carried out with water that is below the minimum threshold temperature and thus would not produce an acceptable quality wash. In some embodiments, the minimum threshold temperature may be 180 degrees Fahrenheit. The system controller 104 also may be operable to open the detergent feed automated valve 154 upon receiving the temperature signal from the wash feed temperature sensor 188 indicating that the feed flow of water is equal to or greater than the minimum threshold temperature. In this manner, once the feed flow in the wash feed line 176 has reached the minimum threshold temperature, the feed flow of detergent in the detergent feed line 146 may be directed to the mixing loop 110 for mixing with the feed flow of water therein.

In some embodiments, the system controller 104 may be operable to control the detergent feed automated valve 154 upon receiving the viscosity signal from the detergent viscosity sensor 144 indicating the viscosity of the supply flow of detergent in the detergent supply line 142. For example, the system controller 104 may be operable to maintain the detergent feed automated valve 154 in the closed position upon receiving the viscosity signal from the detergent viscosity sensor 144 indicating that the viscosity of the supply flow is less than a minimum threshold viscosity value. In this manner, the system controller 104 may be operable to prevent an off-line wash from being carried out without detergent, without the appropriate type of detergent, or with water only. The system controller 104 also may be operable to move the detergent feed automated valve 154 to the open position upon receiving the viscosity signal from the detergent viscosity sensor 144 indicating the viscosity of the supply flow of detergent in the detergent supply line 142 is equal to or greater than the minimum threshold viscosity value. In some embodiments, the system controller 104 may be operable to control the detergent feed automated valve 154 upon receiving the level signal from the detergent level sensor 162 indicating the level of the supply of detergent in the detergent tank 108. For example, the system controller 104 may be operable to maintain the detergent feed automated valve 154 in the closed position upon receiving the level signal from the detergent level sensor 162 indicating that the level of the detergent supply is less than a minimum threshold level value. In this manner, the system controller 104 may be operable to prevent an off-line wash from being carried out without an appropriate quantity of detergent. The system controller 104 also may be operable to move the detergent feed automated valve 154 to the open position upon receiving the level signal from the detergent level sensor 162 indicating the level of the detergent supply is equal to or greater than the minimum threshold viscosity value.

The system controller 104 further may be operable to control the detergent feed automated valve 154 upon receiving one or more of the conductivity signals from the combustor discharge conductivity sensor 248, the turbine discharge conductivity sensor 265, or the exhaust plenum discharge conductivity sensor 282 indicating the conductivity of one or more of the respective discharge flows. For example, the system controller 104 may be operable to maintain the detergent feed automated valve 154 in the open position upon receiving the conductivity signal indicating that the conductivity of the one or more discharge flows is greater than a first maximum threshold conductivity value. In this manner, the system controller 104 may be operable to continue washing the gas turbine engine 10 with water and detergent as long as a certain amount of contaminant particles are being removed therefrom and discharged through the combustor discharge line 238, turbine discharge line 254, or exhaust plenum discharge line 270. The system controller 104 also may be operable to move the detergent feed automated valve 154 to the closed position upon receiving the conductivity signal indicating that the conductivity of the one or more discharge flows is equal to or less than the first maximum threshold conductivity value. In this manner, the system controller 104 may be operable to begin rinsing the gas turbine engine 10 with water only. The system controller 104 further may be operable to move the wash feed automated valve 220 to the closed position upon receiving the conductivity signal indicating that the conductivity of the one or more discharge flows is equal to or less than a second maximum threshold conductivity value, wherein the second maximum threshold conductivity value is less than the first maximum threshold conductivity value. In this manner, the system controller 104 may be operable to stop rinsing the gas turbine engine 10 with water and thus complete the off-line wash. The system controller 104 still further may be operable to control other valves of the water wash system 102 and the overall gas turbine engine system 100 in response to receiving the respective signal from other sensors described herein.

Figure 5:
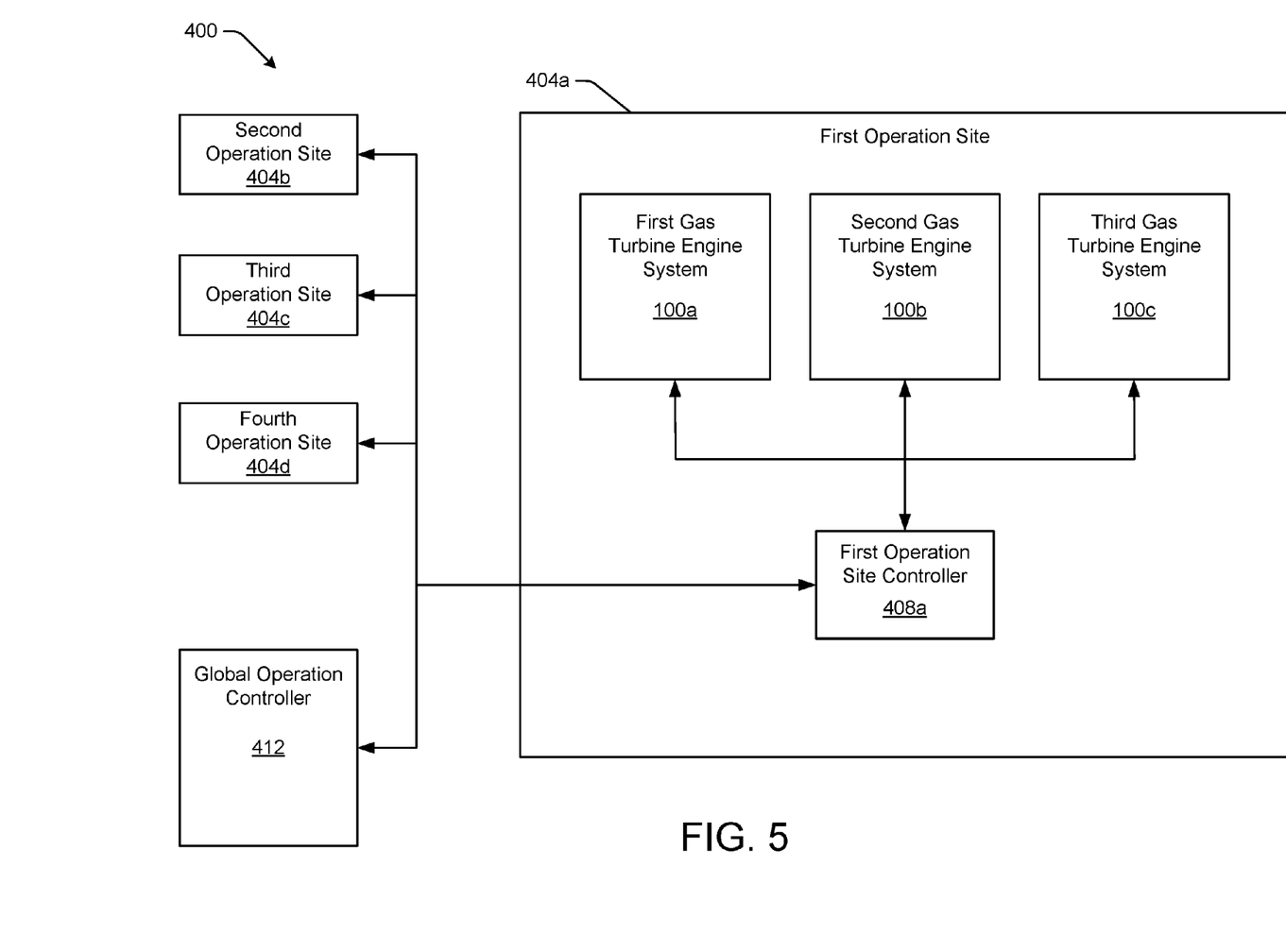
FIG. 5 is a schematic diagram of a global operation system as may be described herein, the system including a number of operation sites having a number of gas turbine engine systems therein and a global operations controller.

FIG. 5 shows a schematic diagram of a global operation system 400 as may be described herein. The global operation system 400 may include a number of operation sites 404 located at various locations in the world. Although FIG. 5 shows four operation sites 404a, 404b, 404c, and 404d, the global operation system 400 may include any number of operations sites. Each operation site 404 may include a number of gas turbine engine systems 100 configured in the manner described above with respect to FIGS. 2-4. For example, a first operation site 404a may include three gas turbine engine systems 100a, 100b, and 100c, as is shown. Each operation site 404 may include any number of gas turbine engine systems 100. Additionally, each operation site 404 may include an operation site controller 408 in communication with each of the gas turbine engine systems 100 included in the operation site 404. For example, the first operation site 404a may include a first operation site controller 408a in communication with each of the gas turbine engine systems 100a, 100b, and 100c, as is shown. The global operation system 400 also may include a global operation controller 412 in communication with each of the operation sites 404 included in the global operation system 400. For example, the global operation controller 412 may be in communication with each of the operation sites 404a, 404b, 404c, and 404d, as is shown. Specifically, the global operation controller 412 may be in communication with the operation site controller 408 of each of the operation sites 404a, 404b, 404c, and 404d, as is shown with respect to the first operation site controller 408a of the first operation site 404a.

Each operation site controller 408 may be in communication with the various sensors of each of the gas turbine engine systems 100 of the operation site 404 to receive the respective signals relating to various operating parameters of the overall gas turbine engine systems 100, including those of the water wash systems 102. Specifically, in some embodiments, the operation site controller 408 may be in communication with the various sensors via the system controllers 104. The operation site controller 408 may be operable to record data of the various operating parameters before, during, and after a wash. For example, the operation site controller 408 may be operable to record the power output before the wash, the power output after the wash, the duration of the wash, the amount of detergent used during the wash, the amount of water used during the wash, the water temperature readings throughout the wash, and the discharge conductivity readings throughout the wash. In some embodiments, the operation site controller 408 may be operable to adjust and locally optimize the operating parameters as well as valve scheduling and timing of the water wash systems 102 to be applied during future washes based on the data recorded from past washes performed for each of the gas turbine engine systems 100 of the operation site 404.

The global operation controller 412 may be in communication with the operation site controllers 408 of each of the operation sites 404 to receive and record the data of the various operating parameters recorded by the operation site controllers 408. In some embodiments, the global operation controller 412 may be operable to adjust and globally optimize the operating parameters as well as valve scheduling and timing of the water wash systems 102 to be applied during future washes based on the data recorded from past washes performed for each of the gas turbine engine systems 100 of the global operation system 400.

The gas turbine engine system 100 described herein above thus provides an improved water wash system 102 for removing contaminant particles from a gas turbine engine 10 to improve overall performance and efficiency of the gas turbine engine 10. Specifically, the water wash system 102 includes various sensors and automated valves in communication with a system controller 104 operable to monitor and control various operating parameters as well as valve scheduling and timing to automatically perform an off-line wash in an efficient manner. Accordingly, the water wash system 102 simplifies performance of the off-line wash process and reduces the amount of shutdown time and the number of operators required to complete an off-line wash. Moreover, the water wash system 102 reduces the incidence of errors in controlling the various flows and monitoring and adjusting the various operating parameters of the water wash system 102. Further, the global operation system 400 and the operation sites 404 described herein above provide improved systems for locally and globally optimizing the operating parameters as well as valve scheduling and timing of a number of water wash systems 102 to be applied during future washes based on data recorded from past washes.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine system, comprising:
   a gas turbine engine, comprising:
      a compressor;
      a combustor in communication with the compressor; and
      a turbine in communication with the combustor;
   a water wash system in communication with the gas turbine engine and configured to remove contaminants from the gas turbine engine, the water wash system comprising:
      a wash feed line in communication with the gas turbine engine;
      a combustor discharge line in communication with the combustor;
      a turbine discharge line in communication with the turbine;
      a plurality of valves configured to control flows through the water wash system; and
      a plurality of sensors configured to measure operating parameters of the water wash system, wherein the plurality of sensors comprises a combustor discharge conductivity sensor configured to measure a conductivity of a combustor discharge flow and a turbine discharge conductivity sensor configured to measure a conductivity of a turbine discharge flow; and
   a system controller in communication with the plurality of valves and the plurality of sensors and operable to automatically control the plurality of valves upon receiving operating parameter signals from the plurality of sensors in order to perform a wash of the gas turbine engine.

2. The gas turbine engine system of claim 1, wherein the plurality of sensors further comprises a wash feed temperature sensor positioned on the wash feed line and configured to measure a temperature of a feed flow and send a temperature signal to the system controller.

3. The gas turbine engine system of claim 2, wherein the system controller is operable to move a wash feed valve to an open position upon receiving the temperature signal indicating that the temperature of the feed flow is equal to or greater than a minimum threshold temperature.

4. The gas turbine engine system of claim 2, wherein the system controller is operable to move a detergent feed valve to an open position upon receiving the temperature signal indicating that the temperature of the feed flow is equal to or greater than a minimum threshold temperature.

5. The gas turbine engine system of claim 1, wherein the plurality of sensors further comprises a detergent viscosity sensor configured to measure a viscosity of a supply flow of detergent and send a viscosity signal to the system controller.

6. The gas turbine engine system of claim 5, wherein the system controller is operable to maintain a detergent feed valve in a closed position upon receiving the viscosity signal indicating that the viscosity of the supply flow of detergent is less than a minimum threshold viscosity.

7. The gas turbine engine system of claim 1, wherein the plurality of sensors further comprises a detergent level sensor configured to measure a level of a detergent supply and send a level signal to the system controller.

8. The gas turbine engine system of claim 7, wherein the system controller is operable to maintain a detergent feed valve in a closed position upon receiving the level signal indicating that the level of the detergent supply is less than a minimum threshold level.

9. The gas turbine engine system of claim 1, wherein the combustor discharge conductivity sensor is configured to send a combustor discharge conductivity signal to the system controller, and wherein the turbine discharge conductivity sensor is configured to send a turbine discharge conductivity signal to the system controller.

10. The gas turbine engine system of claim 9, wherein the system controller is operable to maintain a detergent feed valve in an open position upon receiving one or both of the combustor discharge conductivity signal indicating that the conductivity of the combustor discharge flow is greater than a maximum threshold conductivity and the turbine discharge conductivity signal indicating that the conductivity of the turbine discharge flow is greater than a maximum threshold conductivity.

11. The gas turbine engine system of claim 9, wherein the system controller is operable to move a detergent feed valve to a closed position upon receiving the combustor discharge conductivity signal indicating that the conductivity of the combustor discharge flow is equal to or less than a maximum threshold conductivity and the turbine discharge conductivity signal indicating that the conductivity of the turbine discharge flow is equal to or less than a maximum threshold conductivity.

12. The gas turbine engine system of claim 9, wherein the gas turbine engine further comprises an exhaust plenum in communication with the turbine, wherein the wash system further comprises an exhaust plenum discharge line in communication with the exhaust plenum, wherein the plurality of sensors further comprises an exhaust plenum conductivity sensor configured to measure a conductivity of an exhaust plenum discharge flow and send an exhaust plenum discharge conductivity signal to the system controller.

13. A method of washing a gas turbine engine to remove contaminants from the gas turbine engine, the method comprising:
   providing a water wash system in communication with the gas turbine engine;

measuring, via a plurality of sensors, operating parameters of the water wash system, wherein the plurality of sensors comprises a combustor discharge conductivity sensor configured to measure a conductivity of a combustor discharge flow and a turbine discharge conductivity sensor configured to measure a conductivity of a turbine discharge flow;

sending, via the plurality of sensors, operating parameter signals to a system controller; and automatically controlling, via the system controller, a plurality of valves of the water wash system to control a plurality of flows for performing a wash of the gas turbine engine.

14. A gas turbine engine system, comprising:
a gas turbine engine, comprising:
   a compressor;
   a combustor in communication with the compressor; and
   a turbine in communication with the combustor;
a water wash system in communication with the gas turbine engine and configured to remove contaminants from the gas turbine engine, the water wash system comprising:
   a wash feed line and a wash feed valve positioned on the wash feed line;
   a detergent feed line and a detergent feed valve positioned on the detergent feed line;
   a combustor discharge line in communication with the combustor;
   a turbine discharge line in communication with the turbine; and
   a plurality of sensors configured to measure operating parameters of the water wash system, wherein the plurality of sensors comprises a combustor discharge conductivity sensor configured to measure a conductivity of a combustor discharge flow and a turbine discharge conductivity sensor configured to measure a conductivity of a turbine discharge flow; and
a system controller in communication with the wash feed valve, the detergent feed valve, and the plurality of sensors, and operable to automatically control the wash feed valve and the detergent feed valve upon receiving operating parameter signals from the plurality of sensors in order to perform a wash of the gas turbine engine.

15. The gas turbine engine system of claim 14, wherein the plurality of sensors further comprises a wash feed temperature sensor positioned on the wash feed line and configured to measure a temperature of a feed flow and send a temperature signal to the system controller.

16. The gas turbine engine system of claim 15, wherein the system controller is operable to move the wash feed valve to an open position upon receiving the temperature signal indicating that the temperature of the feed flow is equal to or greater than a minimum threshold temperature.

17. The gas turbine engine system of claim 15, wherein the system controller is operable to move the detergent feed valve to an open position upon receiving the temperature signal indicating that the temperature of the feed flow is equal to or greater than a minimum threshold temperature.

18. The gas turbine engine system of claim 14, wherein the combustor discharge conductivity sensor is configured to send a combustor discharge conductivity signal to the system controller, and wherein the turbine discharge conductivity sensor is configured to send a turbine discharge conductivity signal to the system controller.

19. The gas turbine engine system of claim 18, wherein the system controller is operable to maintain the detergent feed valve in an open position upon receiving one or both of the combustor discharge conductivity signal indicating that the conductivity of the combustor discharge flow is greater than a maximum threshold conductivity and the turbine discharge conductivity signal indicating that the conductivity of the turbine discharge flow is greater than a maximum threshold conductivity.

20. The gas turbine engine system of claim 18, wherein the system controller is operable to move the detergent feed valve to a closed position upon receiving the combustor discharge conductivity signal indicating that the conductivity of the combustor discharge flow is equal to or less than a maximum threshold conductivity and the turbine discharge conductivity signal indicating that the conductivity of the turbine discharge flow is equal to or less than a maximum threshold conductivity.

* * * * *